United States Patent [19]
Rao et al.

[11] Patent Number: 5,640,249
[45] Date of Patent: Jun. 17, 1997

[54] IMAGE PROCESSING APPARATUS USING DERIVED ORDERED DITHER MATRIX

[75] Inventors: Gururaj Rao; Hiroki Kanno, both of Yokohama, Japan

[73] Assignee: Kabushiki Kaisha Toshiba, Kanagawa-ken, Japan

[21] Appl. No.: 200,661

[22] Filed: Feb. 23, 1994

[30] Foreign Application Priority Data

Feb. 26, 1993 [JP] Japan .................................. 5-038113

[51] Int. Cl.⁶ .................................................. H04N 1/46
[52] U.S. Cl. .......................................... 358/457; 358/536
[58] Field of Search .................... 382/252; 358/534–536, 358/457–459, 298

[56] References Cited

U.S. PATENT DOCUMENTS

| | | | |
|---|---|---|---|
| 4,626,901 | 12/1986 | Tanioka | 358/536 |
| 5,014,333 | 5/1991 | Miller et al. | 382/252 |
| 5,204,753 | 4/1993 | Tai | 358/457 |

OTHER PUBLICATIONS

Limb J.O., Bell System Tech. J. 48, pp. 2555–2582, 1969.
An Optimum Method for Two–Level Rendition of Continuous–Tone Pictures by B. E. Bayer, proceedings of the IEEE International Communications Conference, New York, 1973, pp. 26–11 thru 26–15.

*Primary Examiner*—Stephen Brinich
*Attorney, Agent, or Firm*—Limbach & Limbach

[57] ABSTRACT

In multi-gradation level processing performed by using an ordered dither scheme, offset information between one dither matrix value and dither matrices is set, and all multi-gradation level threshold values are calculated from the basic dither matrix values and the offset information. Multi-gradation level processing is performed by comparing an input image with the calculated threshold values. With this operation in the multi-gradation level processing performed by the ordered dither scheme, all the dither threshold values required for the multi-gradation level processing are generated from the basic dither matrix information and the offset information.

10 Claims, 15 Drawing Sheets

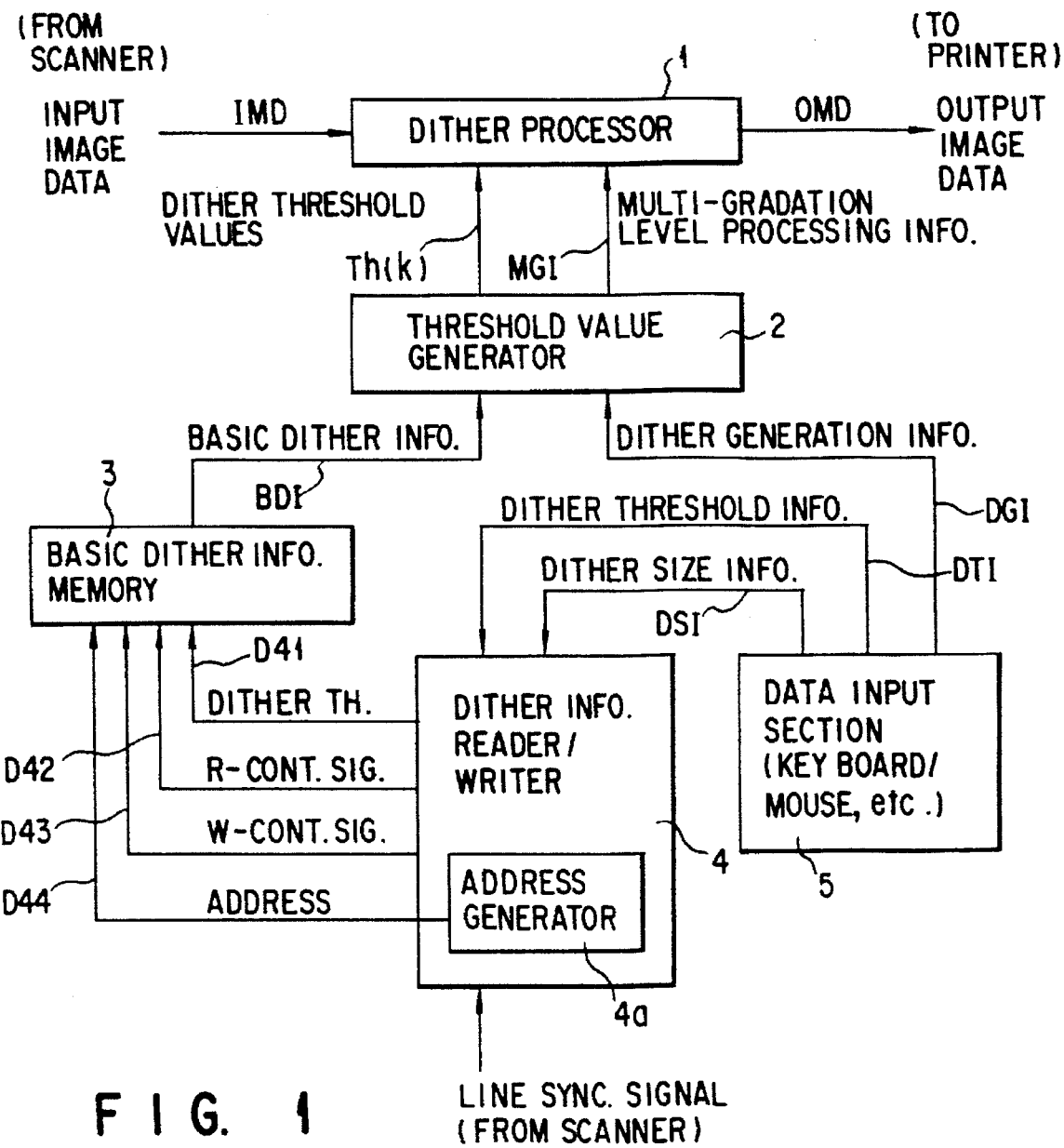
F I G. 1
F I G. 2
BASIC DITHER MATRIX (BD1)

| GRADATION LEVEL | MULTI-GRADATION LEVEL PROCESSING INFO. (15 BITS) | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| 2 | 1 | 0 | 0 | 0 | 0 | 0 | 0 | 0 | 0 | 0 | 0 | 0 | 0 | 0 | 0 |
| 3 | 1 | 1 | 0 | 0 | 0 | 0 | 0 | 0 | 0 | 0 | 0 | 0 | 0 | 0 | 0 |
| 4 | 1 | 1 | 1 | 0 | 0 | 0 | 0 | 0 | 0 | 0 | 0 | 0 | 0 | 0 | 0 |
| 5 | 1 | 1 | 1 | 1 | 0 | 0 | 0 | 0 | 0 | 0 | 0 | 0 | 0 | 0 | 0 |
| ⋮ | | | | | | | | | | | | | | | |
| 13 | 1 | 1 | 1 | 1 | 1 | 1 | 1 | 1 | 1 | 1 | 1 | 1 | 0 | 0 | 0 |
| 14 | 1 | 1 | 1 | 1 | 1 | 1 | 1 | 1 | 1 | 1 | 1 | 1 | 1 | 0 | 0 |
| 15 | 1 | 1 | 1 | 1 | 1 | 1 | 1 | 1 | 1 | 1 | 1 | 1 | 1 | 1 | 0 |
| 16 | 1 | 1 | 1 | 1 | 1 | 1 | 1 | 1 | 1 | 1 | 1 | 1 | 1 | 1 | 1 |
FIG. 3
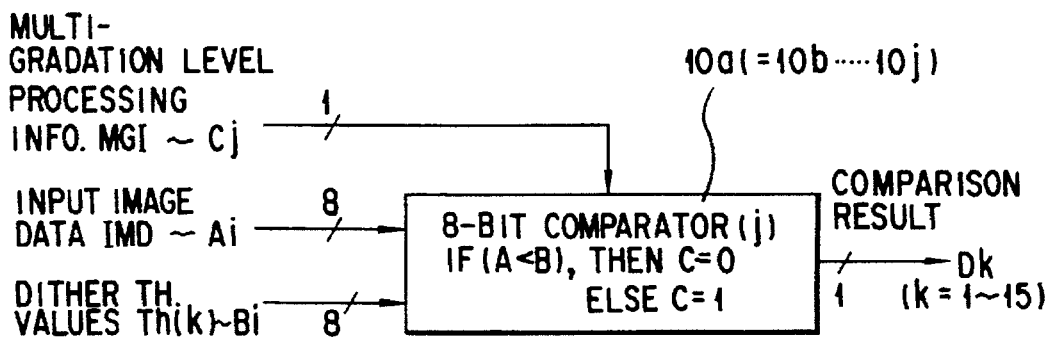
FIG. 5
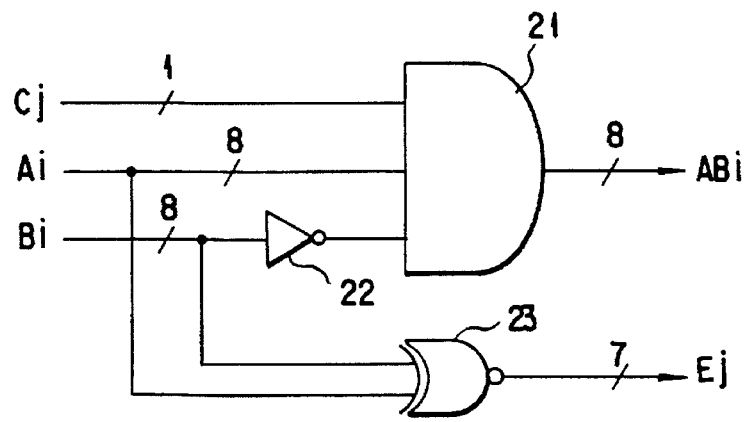
$A_i$; BIT i OF INPUT A  
$B_i$; BIT i OF INPUT B  
(i = 0 TO 7)  
$E_j$; EXNOR OF INPUTS $A_i$ & $B_i$  
(j = 1 TO 7)  
$C_j$; SELECT SIGNAL FOR COMPARATOR (j)  
(COMPARATOR (j) IS SELECTED IF $C_j$ = 0)
FIG. 6

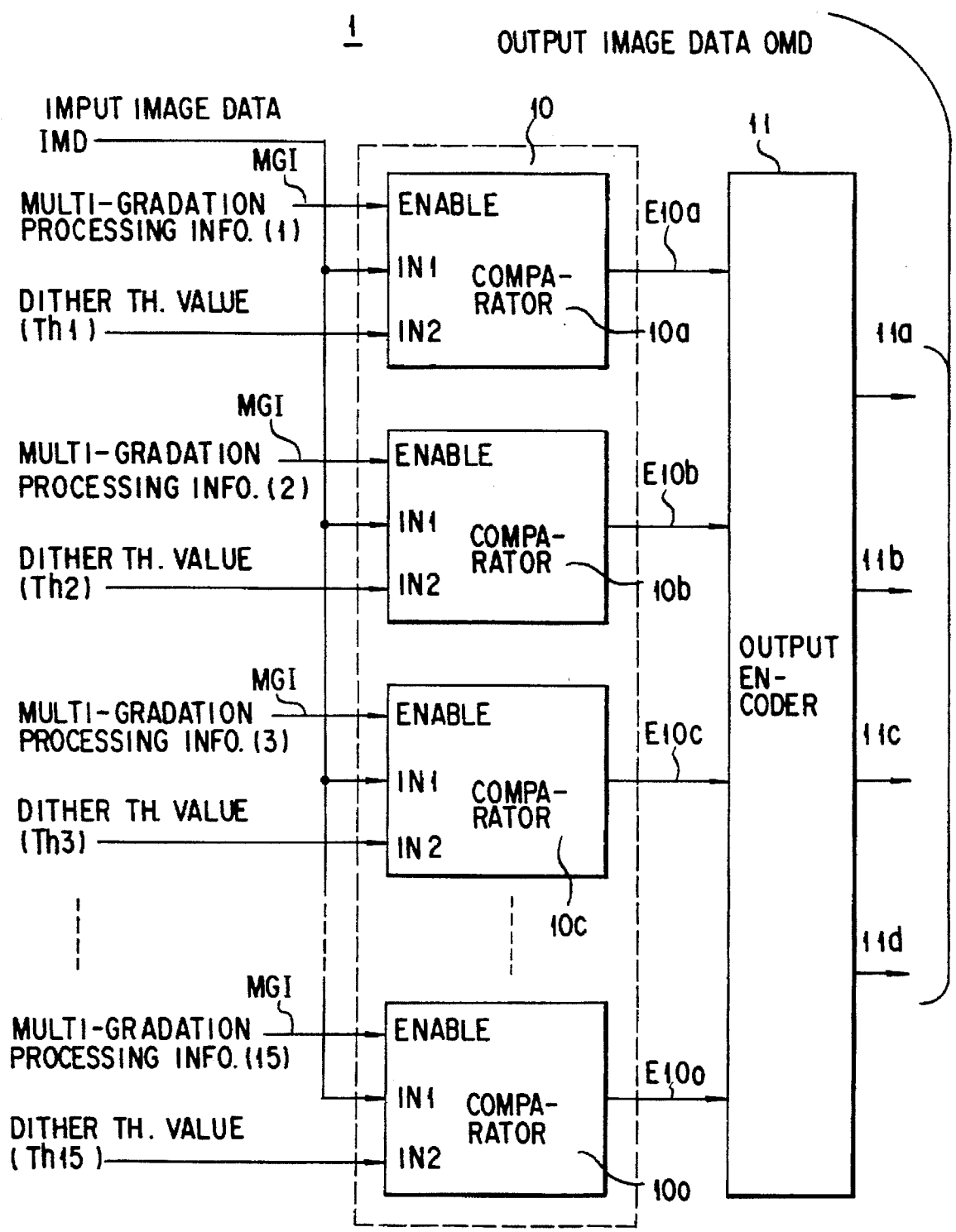
F I G. 4

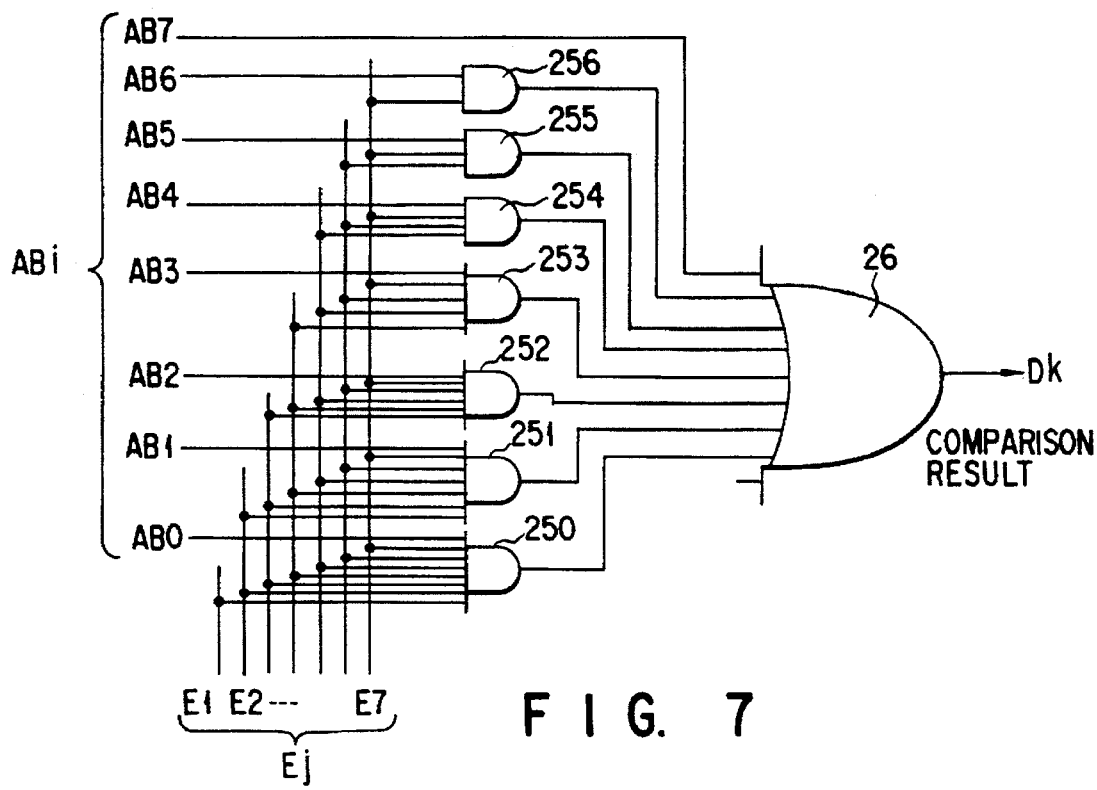
FIG. 7
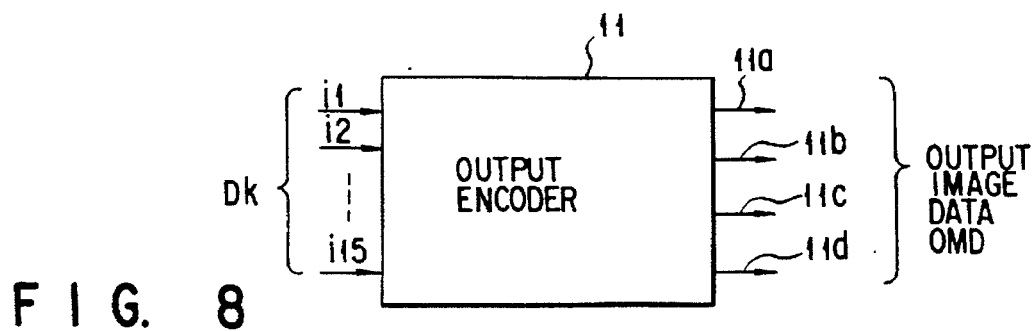
FIG. 8
| COMPARISON RESULT (Dk) | | | | | | OUTPUT IMAGE DATA (OMD) | | | |
|---|---|---|---|---|---|---|---|---|---|
| i1 | i2 | i3 | i13 | i14 | i15 | 11a | 11b | 11c | 11d |
| 0 | 0 | 0 | --- 0 | 0 | 0 | 0 | 0 | 0 | 0 |
| 1 | 0 | 0 | --- 0 | 0 | 0 | 1 | 0 | 0 | 0 |
| 1 | 1 | 0 | --- 0 | 0 | 0 | 0 | 1 | 0 | 0 |
| 1 | 1 | 1 | --- 0 | 0 | 0 | 1 | 1 | 0 | 0 |
| ⋮ | ⋮ | ⋮ | ⋮ | | | ⋮ | | | |
| 1 | 1 | 1 | --- 1 | 0 | 0 | 1 | 0 | 1 | 1 |
| 1 | 1 | 1 | --- 1 | 1 | 0 | 0 | 1 | 1 | 1 |
| 1 | 1 | 1 | --- 1 | 1 | 1 | 1 | 1 | 1 | 1 |
FIG. 9

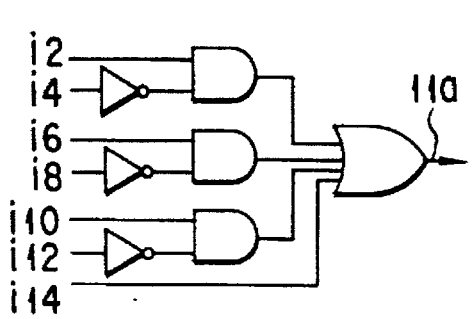
F I G. 10A
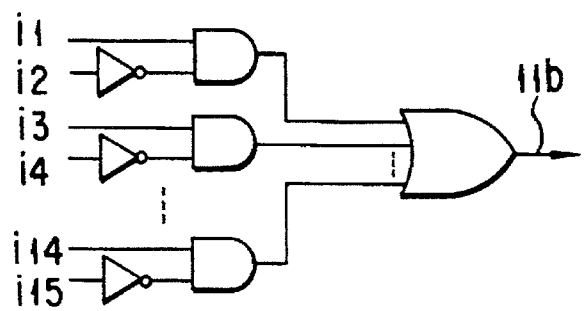
F I G. 10B
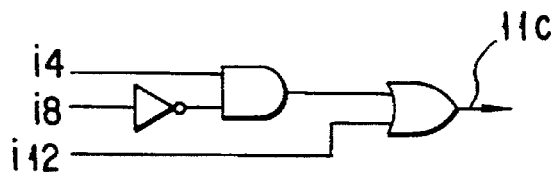
F I G. 10C
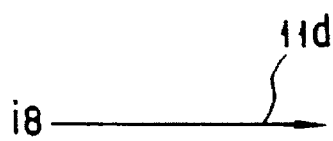
F I G. 10D
PLANE P1 (BASIC MATRIX)   PLANE P2   PLANE P3
(DERIVED MATRICES)
F I G. 11

PLANE P1
(BASIC MATRIX)

| 66 | 9 | 37 |
|---|---|---|
| 57 | 0 | 28 |
| 76 | 19 | 47 |

+85 =

PLANE P2
(DERIVED MATRICES)

| 151 | 94 | 122 |
|---|---|---|
| 142 | 85 | 113 |
| 161 | 104 | 132 |

+85 =

PLANE P3

| 236 | 179 | 207 |
|---|---|---|
| 227 | 170 | 198 |
| 246 | 189 | 217 |

F I G. 15

PLANE P1 (BASIC MATRIX)

| "7" | "1" | "4" |
|---|---|---|
| "6" | "0" | "3" |
| "8" | "2" | "5" |

PLANE P2 (DERIVED MATRICES)

| "6" | "7" | "8" |
|---|---|---|
| "5" | "0" | "1" |
| "4" | "3" | "2" |

PLANE P3

| "0" | "7" | "2" |
|---|---|---|
| "6" | "4" | "5" |
| "3" | "8" | "1" |

F I G. 17A   F I G. 17B   F I G. 17C

| b0 | b1 | b2 | b3 | b4 | b5 | b6 | b7 | b8 | b9 | b10 | b11 |
|---|---|---|---|---|---|---|---|---|---|---|---|

PLANE P1 INFO.  PLANE P2 INFO.  PLANE P3 INFO.

F I G. 18

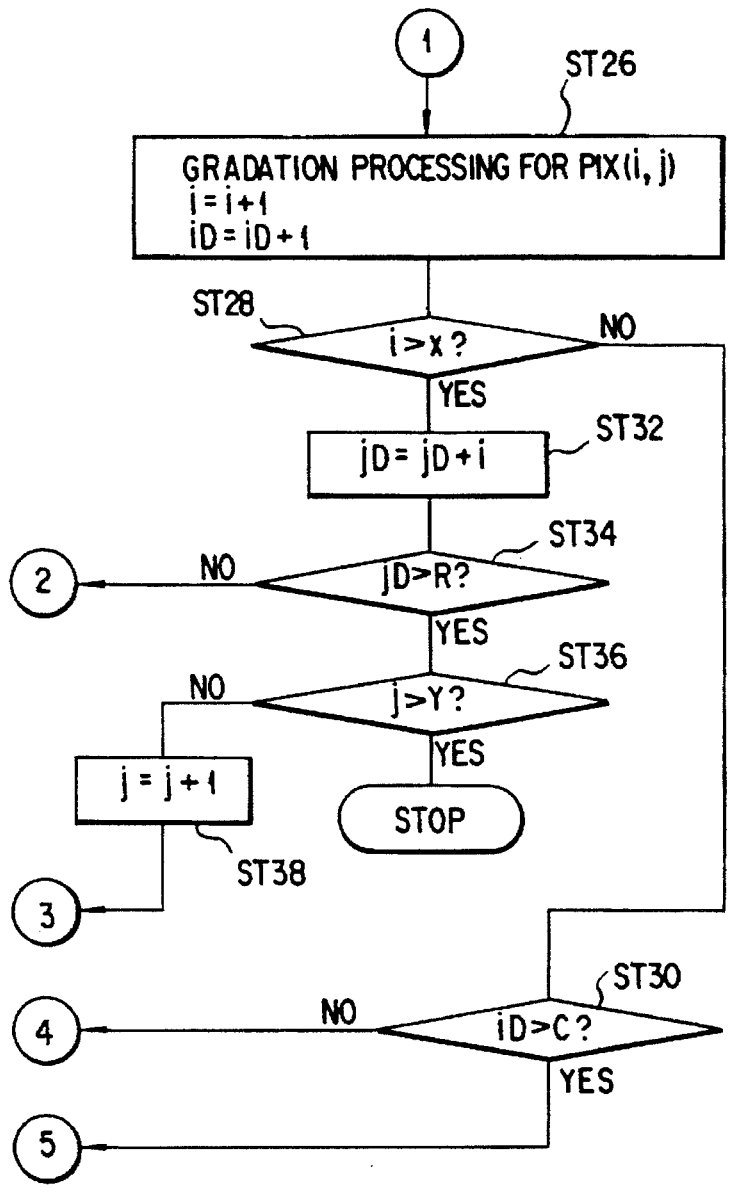
F I G. 20B
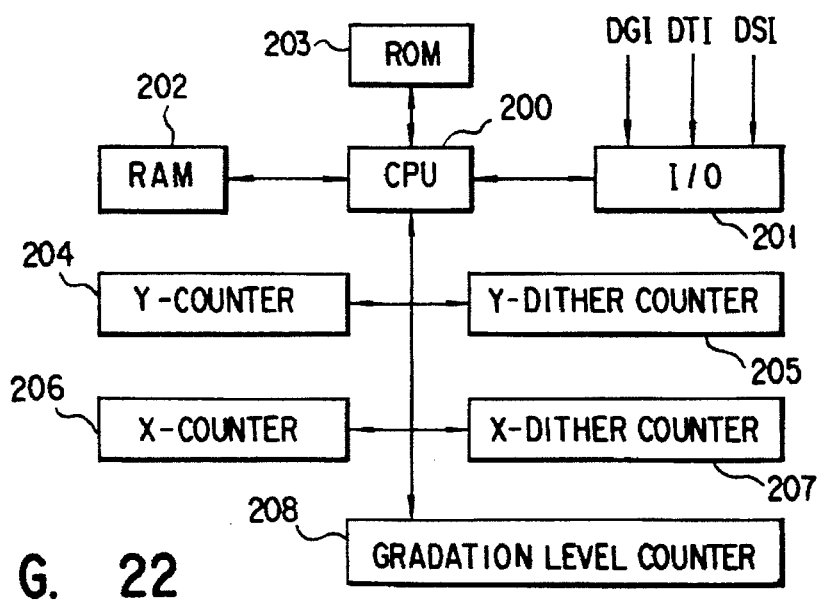
F I G. 22

BASIC DITHER MATRIX 1

| 0C | 15 | 23 | 27 | 28 | 1A | 0E | 0D |
|----|----|----|----|----|----|----|----|
| 17 | 16 | 1D | 1E | 1F | 20 | 19 | 18 |
| 24 | 1C | 10 | 11 | 12 | 13 | 21 | 25 |
| 26 | 1B | 0F | 0A | 0B | 14 | 22 | 29 |
| 28 | 1A | 0E | 0D | 0C | 15 | 23 | 27 |
| 1F | 20 | 19 | 18 | 17 | 16 | 1D | 1E |
| 12 | 13 | 21 | 25 | 24 | 1C | 10 | 11 |
| 0B | 14 | 22 | 29 | 26 | 1B | 0F | 0A |

FIG. 21A

DERIVED DITHER MATRIX 2

| 2C | 35 | 43 | 47 | 48 | 3A | 2E | 2D |
|----|----|----|----|----|----|----|----|
| 37 | 36 | 3D | 3E | 3F | 40 | 39 | 38 |
| 44 | 3C | 30 | 31 | 32 | 33 | 41 | 45 |
| 46 | 3B | 2F | 2A | 2B | 34 | 42 | 49 |
| 48 | 3A | 2E | 2D | 2C | 35 | 43 | 47 |
| 3F | 40 | 39 | 38 | 37 | 36 | 3D | 3E |
| 32 | 33 | 41 | 45 | 44 | 3C | 30 | 31 |
| 2B | 34 | 42 | 49 | 46 | 3B | 2F | 2A |

FIG. 21B

+(20)hex

DERIVED DITHER MATRIX 3

| 4C | 55 | 63 | 67 | 68 | 5A | 4E | 4D |
|----|----|----|----|----|----|----|----|
| 57 | 56 | 5D | 5E | 5F | 60 | 59 | 58 |
| 64 | 5C | 50 | 51 | 52 | 53 | 61 | 65 |
| 66 | 58 | 4F | 4A | 4B | 54 | 62 | 69 |
| 68 | 5A | 4E | 4D | 4C | 55 | 63 | 67 |
| 5F | 60 | 59 | 58 | 57 | 56 | 5D | 5E |
| 52 | 53 | 61 | 65 | 64 | 5C | 50 | 51 |
| 4B | 54 | 62 | 69 | 66 | 5B | 4F | 4A |

FIG. 21C

DERIVED DITHER MATRIX 4

| 6C | 75 | 83 | 87 | 88 | 7A | 6E | 6D |
|----|----|----|----|----|----|----|----|
| 77 | 76 | 7D | 7E | 7F | 80 | 79 | 78 |
| 84 | 7C | 70 | 71 | 72 | 73 | 81 | 85 |
| 86 | 7B | 6F | 6A | 6B | 74 | 82 | 89 |
| 88 | 7A | 6E | 6D | 6C | 75 | 83 | 87 |
| 7F | 80 | 79 | 78 | 77 | 76 | 7D | 7E |
| 72 | 73 | 81 | 85 | 84 | 7C | 70 | 71 |
| 6B | 74 | 82 | 89 | 86 | 7B | 6F | 6A |

FIG. 21D

FROM MATRIX 4 —— +(20)hex ——→

DERIVED DITHER MATRIX 5

| 8C | 95 | A3 | A7 | A8 | 9A | 8E | 8D |
|----|----|----|----|----|----|----|----|
| 97 | 96 | 9D | 9E | 9F | A0 | 99 | 98 |
| A4 | 9C | 90 | 91 | 92 | 93 | A1 | A5 |
| A6 | 9B | 8F | 8A | 8B | 94 | A2 | A9 |
| A8 | 9A | 8E | 8D | 8C | 95 | A3 | A7 |
| 9F | A0 | 99 | 98 | 97 | 96 | 9D | 9E |
| 92 | 93 | A1 | A5 | A4 | 9C | 90 | 91 |
| 8B | 94 | A2 | A9 | A6 | 9B | 8F | 8A |

F I G. 21E

DERIVED DITHER MATRIX 6

| AC | B5 | C3 | C7 | C8 | BA | AE | AD |
|----|----|----|----|----|----|----|----|
| B7 | B6 | BD | BE | BF | C0 | B9 | B8 |
| C4 | BC | B0 | B1 | B2 | B3 | C1 | C5 |
| C6 | BB | AF | AA | AB | B4 | C2 | C9 |
| C8 | BA | AE | AD | AC | B5 | C3 | C7 |
| BF | C0 | B9 | B8 | B7 | B6 | BD | BE |
| B2 | B3 | C1 | C5 | C4 | BC | B0 | B1 |
| AB | B4 | C2 | C9 | C6 | BB | AF | AA |

F I G. 21F

+(20)hex

DERIVED DITHER MATRIX 7

| CC | D5 | E3 | E7 | E8 | DA | CE | CD |
|----|----|----|----|----|----|----|----|
| D7 | D6 | DD | DE | DF | E0 | D9 | D8 |
| E4 | DC | D0 | D1 | D2 | D3 | E1 | E5 |
| E6 | DB | CF | CA | CB | D4 | E2 | E9 |
| E8 | DA | CE | CD | CC | D5 | E3 | E7 |
| DF | E0 | D9 | D8 | D7 | D6 | DD | DE |
| D2 | D3 | E1 | E5 | E4 | DC | D0 | D1 |
| CB | D4 | E2 | E9 | E6 | DB | CF | CA |

F I G. 21G

IMAGE PROCESSING APPARATUS USING DERIVED ORDERED DITHER MATRIX

BACKGROUND OF THE INVENTION

1. Field of the Invention

The present invention relates to an image processing apparatus capable of performing error diffusion processing and ordered dither gradation processing.

2. Description of the Related Art

In general, in a document image processing apparatus capable of handling not only code information but also image information, an original image read by a reading means such as a scanner is performed such that simple binarization (or digitization) processing is performed with respect to image information having contrast, e.g., character and line graphic information, by using fixed threshold values, while binarization processing based on a pseudo-gradation means such as an ordered dither method is performed with respect to image information having gradation, e.g., photographic information. With this operation, a print including a portion with gradation is output from a binary printer or the like which has a small number of available gradation levels.

An ordered dither binarization method (reference: Design of dither waveforms for quantized visual signals by Limb J. O., Bell System Tech. J. 48, pp. 2555–2582, 1969) is a method of performing binarization processing by adding a periodic dither signal to an input pixel or a threshold value.

In multi-gradation level processing performed by using a conventional ordered dither method, when the number of output gradation levels of data obtained after processing is small, dither threshold values can be generated by using a plurality of memories or performing a memory read operation a plurality of number of times. However, as the number of gradation levels increases, a memory and a register for storing a larger number of dither threshold values are required.

In addition, if a memory device such as an SRAM is used as a memory for storing dither threshold values in accordance with the size of a dither matrix, a plurality of memories corresponding to the required number of gradation levels are prepared, or one memory in which all threshold values are stored is prepared, and threshold values corresponding to the number of gradation levels are read out from the memory or memories in units of pixels. If a plurality of memories are prepared, the number of data lines increases, resulting in a complicated structure. If one memory is prepared, since read operations corresponding to the number of gradation levels are performed in units of pixels, a long processing time is required, resulting in a decrease in gradation processing speed.

SUMMARY OF THE INVENTION

It is an object of the present invention to provide an image processing apparatus used for multi-gradation level processing performed by using an ordered dither scheme, in which one or more dither threshold values used for the multi-gradation level processing are generated from basic dither matrix information so that an increase in speed of multi-gradation level processing and simplification of the structure can be realized.

According to the present invention, there is provided an image processing apparatus for performing multi-gradation level processing by ordered dither processing, comprising setting means for setting offset information indicating an offset between one basic dither matrix value and one or more dither matrices, storage means for storing the offset information between the one basic dither matrix value and the dither matrix set by the setting means, threshold value calculating means for calculating one or more multi-gradation level dither threshold values from basic dither matrix values and the offset information, and multi-gradation level processing means for performing multi-gradation level processing by comparing an input image with the threshold values calculated by the threshold value calculating means.

According to the present invention, with the above-described arrangement, in multi-gradation level processing performed by using an ordered dither scheme, all the dither threshold values required for the multi-gradation level processing are derived from basic dither matrix information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram showing the arrangement of an image processing apparatus according to an embodiment of the present invention;

FIG. 2 shows a basic dither matrix stored in basic dither information memory 3;

FIG. 3 shows the correspondence between the number of gradation levels and multi-gradation level information to be processed in the embodiment in FIG. 1;

FIG. 4 is a block diagram for explaining an example of the internal arrangement of dither processor 1 in FIG. 1;

FIG. 5 is a block diagram for explaining the internal arrangement of each comparator shown in FIG. 4;

FIG. 6 is a circuit diagram showing part of the internal arrangement of comparator 10a in FIG. 5;

FIG. 7 is a circuit diagram showing another part of the internal arrangement of comparator 10a in FIG. 5;

FIG. 8 is a block diagram for explaining a detailed arrangement of output encoder 11 in FIG. 4;

FIG. 9 shows the relationship between the inputs and outputs of output encoder 11 in FIG. 8;

FIGS. 10A to 10D are circuit diagrams showing an example of the internal arrangement of output encoder 11 in FIG. 8;

FIG. 11 is a view for explaining second and third dither matrices derived from the basic dither matrix shown FIG. 2 in a case wherein four-gradation level processing is performed by the apparatus in FIG. 1;

FIG. 15 is a view for explaining modifications of the dither matrices shown in FIG. 11;

FIGS. 17A to 17C show other modifications of the dither matrices in FIG. 11;

FIG. 18 is a view for explaining the data format of basic dither information used in the modification shown in FIGS. 17A to 17C;

FIGS. 20A and 20B are flow charts for explaining a case wherein gradation processing based on an ordered dither method using derived dither matrices is performed by means of software;

FIGS. 21A to 21G show second to seventh dither matrices derived from a basic dither matrix in a case wherein eight-gradation level processing is performed; and FIG. 22 is a block diagram showing an example of hardware for executing the software processing shown in FIGS. 20A and 20B.

DETAILED DESCRIPTION OF THE PREFERRED EMBODIMENTS

Figure 12:
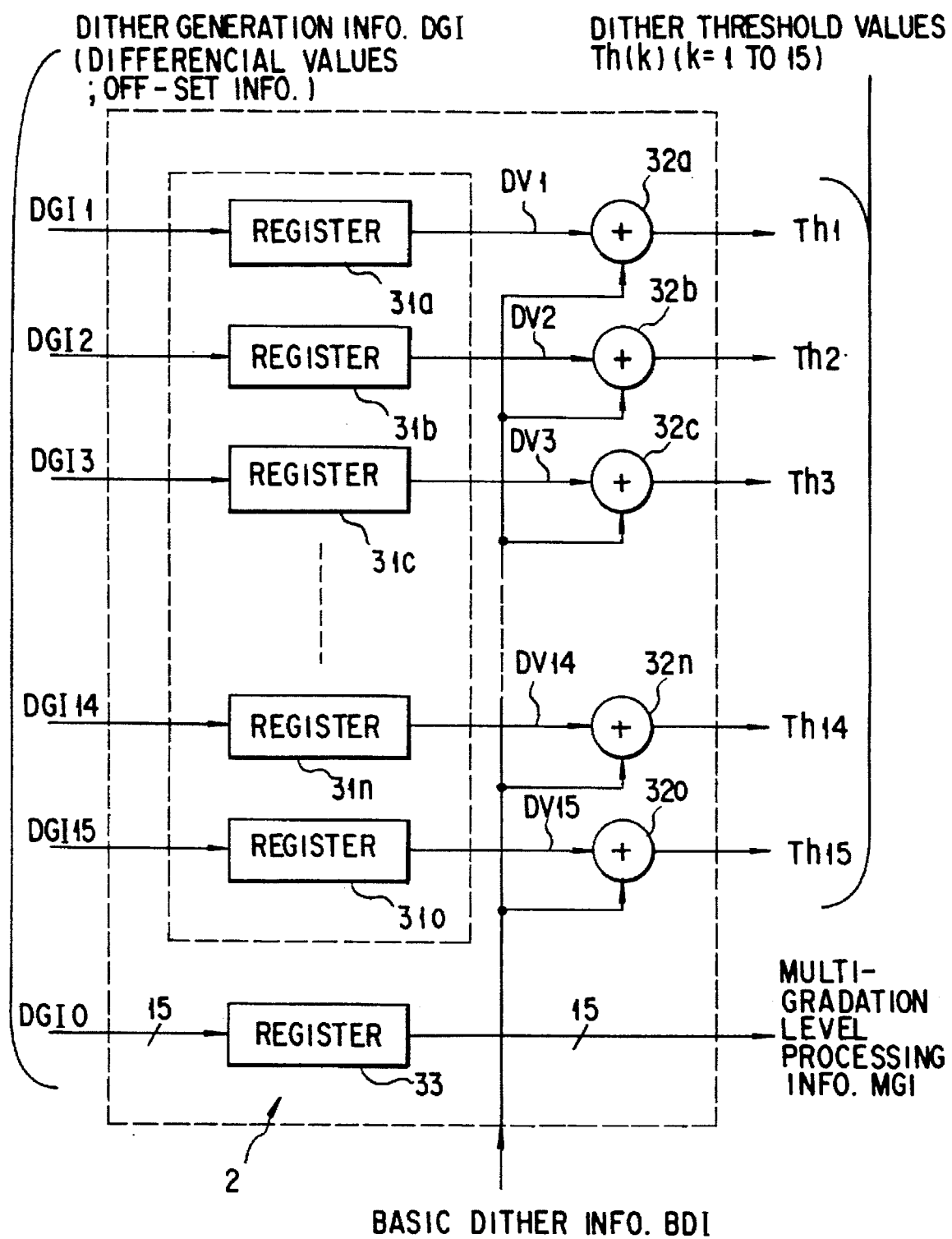
FIG. 12 is a block diagram showing an example of the internal arrangement of threshold value generator 2 in FIG. 1.

An embodiment of the present invention will be described below with reference to the accompanying drawings.

FIG. 1 is a schematic view of an image processing apparatus of the present invention. Image information read by a reader such as an image scanner is input, as digital data, consisting of, for example, eight bits per pixel, to dither processor 1. Gradation processing is then performed with respect to this input data by an ordered dither multi-gradation level processing method using this apparatus. As this ordered dither multi-gradation level processing, a method of performing multi-gradation level processing of an input image by using threshold values which change periodically is used.

As shown in FIG. 1, the image processing apparatus comprises dither processor 1, threshold value generator 2, basic dither information memory 3, dither information reader/writer 4, and data input section 5.

Dither processor 1 performs multi-gradation level processing of input image data IMD on the basis of dither threshold values Th(k), supplied from threshold value generator 2, and multi-gradation level processing information MGI, and outputs the resultant multi-gradation level information, as output image data OMD, to a printer (not shown) or the like.

Threshold value generator 2 outputs dither threshold values Th(k) in accordance with dither generation information DGI from data input section 5 and basic dither information BDI supplied from basic dither information memory 3, and also outputs multi-gradation level processing information MGI corresponding to the number of gradation levels defined by dither generation information DGI from data input section 5.

Basic dither information memory 3 serves to store basic dither matrix information in accordance with write control signal D43, address D44, and dither threshold D41 supplied from dither information reader/writer 4. In accordance with read control signal D42 and address D44, basic dither information BDI is read out from the corresponding address in basic dither information memory 3.

Consider, for example, a 3×3 matrix. In this case, as shown in FIG. 2, "198" is stored at address 0; "28", at address 1; "113", at address 2; "170", at address 3; "0", at address 4; "85", at address 5; "227", at address 6; "57", at address 7; and "142", at address 8.

Dither information reader/writer 4 includes address generator 4a for generating address D44, at which input image data IMD to be processed is stored, in accordance with dither size information DSI from data input section 5 and a line sync signal from the scanner. Dither information reader/writer 4 serves to perform write control of basic dither information from data input section 5 with respect to basic dither information memory 3 and also perform read control of basic dither information from basic dither information memory 3. Dither information reader/writer 4 supplies dither threshold D41, address D44, write control signal D43, and read control signal D42, to basic dither information memory 3, for each unit of basic dither information as data to be stored.

Data input section 5 is constituted by a keyboard, a mouse, and the like and is designed to set dither size (3×3 matrix size) information, dither threshold values ("198", "28", "113", and the like) as basic dither information, threshold value generation information as differential data (offset values) between the dither threshold values of a basic matrix and those of another matrix, and the like. Dither size information DSI and dither threshold information DTI are output to dither information reader/writer 4. In addition, multi-gradation level processing information (15 bits) corresponding to a predetermined number of gradation levels and dither generation information DGI as differential data are output to threshold value generator 2.

This multi-gradation level processing information is set in accordance with the number of gradation levels of an output device such as a printer. As shown in FIG. 3, multi-gradation level processing information is output as 15-bit data in accordance with each number of gradation levels.

As shown in FIG. 4, dither processor 1 comprises comparison means 10 constituted by 15 comparators 10a to 10o, and output encoder 11. With this arrangement, the number of multi-gradation levels (gradation levels) can be increased up to "16". One-bit data (1) to (15) of multi-gradation level processing information MGI from threshold value generator 2 are respectively supplied, as enable signals, to comparators 10a to 10o. In addition, dither threshold values Th(k)=Th1 to Th15 from threshold value generator 2 and input image data IMD are respectively supplied to comparators 10a to 10o.

When the number of gradation levels is "2", since only first bit (1) of multi-gradation level processing information MGI is at "1", only comparator 10a is enabled. As a result, only comparator 10a compares dither threshold value Th1 with input image data IMD. When the number of gradation levels is "4", since first to third bits (1) to (3) of multi-gradation level processing information MGI are at "1", comparators 10a, 10b, and 10c are enabled. As a result, only comparators 10a, 10b, and 10c respectively compare dither threshold values Th1 to Th3 with input image data IMD. In this case, for example, the dither threshold values respectively supplied to comparators 10a, 10b, and 10c are set such that Th1="198", Th2="207", and Th3="217".

Any comparator (of comparators 10a to 10o) set in the above-mentioned enabled state outputs "1" to output encoder 11 when input image data IMD is larger than dither threshold value Th(k) (k=1, 2, . . . 15), and outputs "0" to output encoder 11 when input image data IMD is smaller than dither threshold value Th(k). In addition, "0" is always output from any comparator which is not in an enabled state.

Output encoder 11 has four output lines 11a to 11d and outputs output image data OMD corresponding to comparison results E10a to E10o respectively supplied from comparators 10a to 10o, as shown in FIG. 4. When the number of gradation levels is "2", output image data is output through output line 11a. When the number of gradation levels is "3" and "4", output image data OMD are output through output lines 11a and 11b, respectively. When the number of gradation levels is "5" to "8", output image data OMD are output through output lines 11a, 11b, and 11c, respectively. When the number of gradation levels is "9" to "16", output image data OMD is output through output lines 11a to 11d.

FIGS. 5 to 7 show a detailed arrangement of each of comparators 10a to 10o. Referring to FIG. 5, reference symbol A (Ai) denotes a bit of input image data IMD; and B (Bi), dither threshold value Th(k). As shown in FIG. 5, comparator 10a compares 8-bit input image data IMD with 8-bit dither threshold value Th1 and outputs a 1-bit comparison result.

As shown in FIG. 6, the input side of comparator 10a is constituted by AND gate 21, inverter 22, and exclusive OR gate 23. As shown in FIG. 7, the output side of comparator 10a is constituted by AND gates 25a to 25b, and OR gate 26.

FIGS. 8 to 10 show an example of the operation of output encoder 11. Referring to FIG. 8, reference symbols i0 to i15 denote comparison results Dk (i1 to i15) from comparators 10a to 10o, respectively. Output encoder 11 outputs output image data OMD (11a to 11d) corresponding to comparison results Dk from comparators 10a to 10o. FIG. 9 shows the relationship between the inputs (Dk) and the outputs (OMD) in this case. Output encoder 11 is constituted by logic circuits like those shown in FIGS. 10A to 10D.

Multi-gradation dither threshold values used in the present invention will be described next. Assume that four-gradation level processing is to be performed by using a $3^2 3$ square dither matrix. In this case, as shown in FIG. 11, the dither threshold values of three dither matrices must be used. Dither threshold values Th(k) of the respective dither matrices are represented by planes P1, P2, and P3. In this embodiment, the differential values between the dither threshold values of the respective planes are set to be constant. The differential value between planes P1 and P2 is set to be "+9"; and the differential value between planes P1 and P3, "+19". (The differential value between planes P2 and P3 is "+10".)

Threshold value generator 2 uses plane P1, of three planes P1, P2, and P3, as a basic matrix, and derives dither threshold values corresponding to remaining two planes P2 and P3 by using the basic dither threshold values of plane P1 and the above-mentioned differential values.

For example, as shown in FIG. 12, threshold value generator 2 is constituted by 15 buffer registers 31a to 31o, 15 adders 32a to 32o, and register 33. Registers 31a to 31o are designed to store pieces of dither generation information DGI1 to DGI15 supplied from basic dither information memory 3, respectively. For example, when the number of gradation levels is "2", the differential value "0" (DGI1) is stored only in register 31a; when the number of gradation levels is "3" and "4", predetermined differential values (DGI1 to DGI3) are respectively set in registers 31a to 31c; when the number of gradation levels is "5" to "8", predetermined differential values (DGI1 to DGI7) are respectively stored in registers 31a to 31g; and when the number of gradation levels is "9" to "16", predetermined differential values (DGI1 to DGI15) are respectively stored in registers 31a to 31o. Assume that the number of gradation levels is "4", and the dither threshold values of planes P1, P2, and P3 in FIG. 11 are used. In this case, the differential value "0" (DGI1), the differential value "+9" (DGI2), and the differential value "+19" (DGI3) are respectively stored in registers 31a, 31b, and 31c. Differential value data DV1 to DV15 output from registers 31a to 31o are respectively output to adders 32a to 32o.

Adders 32a to 32o respectively add differential value data DV1 to DV15 from registers 31a to 31o to basic dither information BDI (dither threshold values) from basic dither information memory 3. Addition results Th1 to Th15 are respectively output as dither threshold values Th(k).

Register 33 stores dither generation information DGI0 (15 bits) corresponding to the number of gradation levels and supplied from data input section 5, and outputs multi-gradation level processing information MGI, as enable signals, to comparators 10a to 10o in dither processor 1 shown in FIG. 4.

Figure 13:
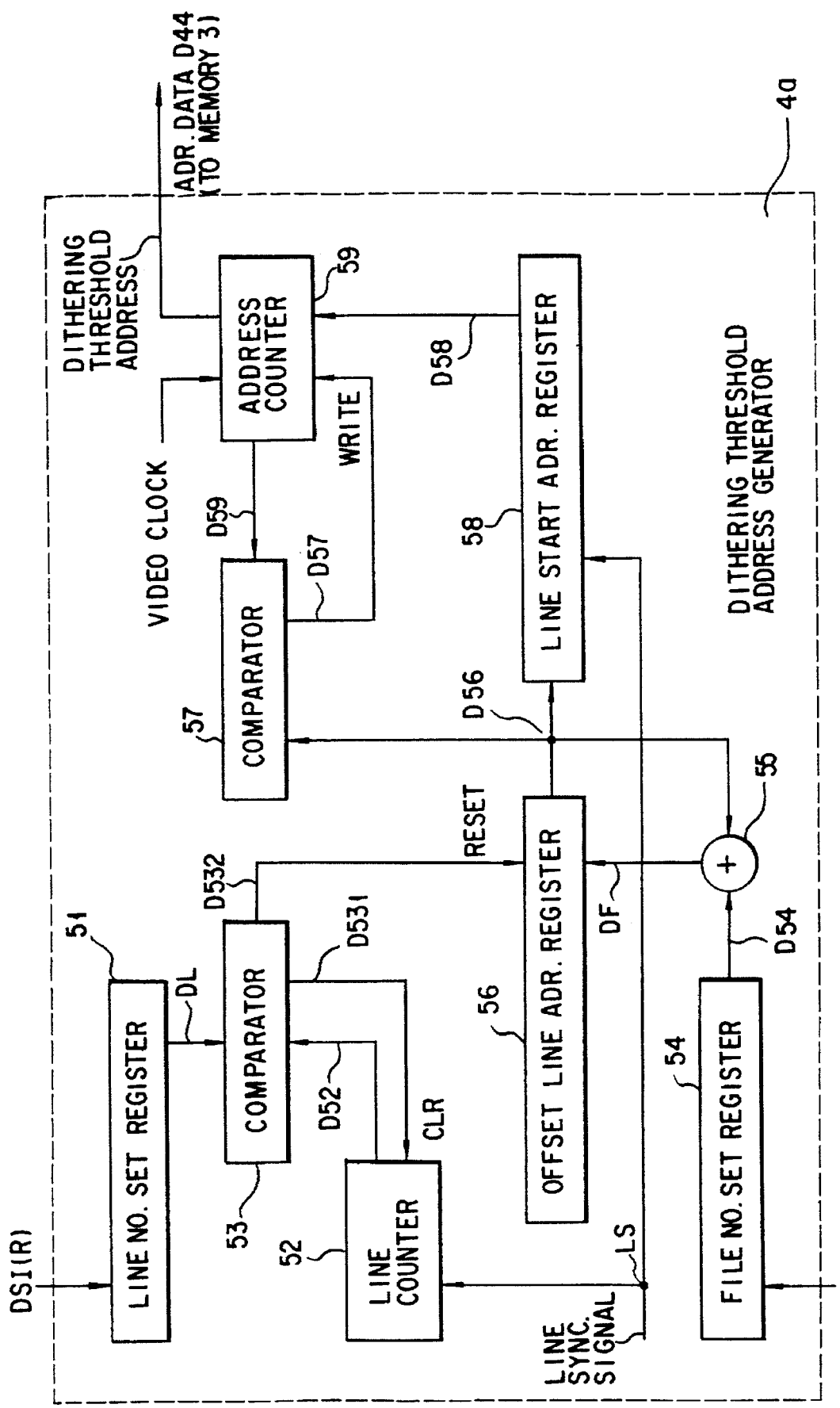
FIG. 13 is a block diagram showing an example of the internal arrangement of address generator 4a in FIG. 1.

As shown in FIG. 13, address generator 4a arranged in dither information reader/writer 4 in FIG. 1 is constituted by line No. set register 51, line counter 52, comparator 53, file No. set register 54, adder 55, offset line address register 56, comparator 57, line start address register 58, and address counter 59.

Dither matrix line data DL is set in line No. set register 51. Line counter 52 is a counter which counts every time line sync signal LS is supplied from a scanner (not shown). Count value D52 is output to comparator 53, and line counter 52 is cleared by clear signal DS31 from comparator 53. That is, line counter 52 is cleared for each line of the dither matrix set in line No. set register 51.

Comparator 53 compares the set count value (DL) of line No. set register 51 with the count vale (D52) of line counter 52. When the count values coincide with each other (DL= D52), comparator 53 clears line counter 52 and outputs reset signal DS32 to offset line address register 56.

Dither matrix file data DF is set in file No. set register 54. Adder 55 adds line No. data D56, output from offset line address register 56, to set file No. data D54 from file No. set register 54, and outputs addition result DF to offset line address register 56.

When offset line address register 56 is reset by reset signal DS32 from comparator 53, register 56 stores offset address data DF. Comparator 57 compares address data D56 from offset line address register 56 with address data D59 from address counter 59. When the address (D59) from address counter 59 corresponds to a value immediately before the offset address (D56), comparator 57 outputs write signal D57 to address counter 59.

Address data D56 from offset line address register 56 is set in line start address register 58 every time line sync signal LS is supplied. Start address data D58 from line start address register 58 is set in address counter 59 in accordance with write signal D57 from comparator 57. Every time an image clock is supplied, address counter 59 increments the value of address data D58 and outputs the count value as address data D44.

Four-gradation level processing performed in the above-described arrangement by using 3×3 dither matrices will be described next. First, data input section 5 is used to set basic dither information BDI as shown in FIG. 2, "3×3" as a dither size, "+9" as the differential value between planes P1 and P2, and "+19" as the differential value between planes P1 and P3.

With this operation, "111000000000000" is output, as multi-gradation level information corresponding to the number of gradation levels, "4", from data input section 5 to threshold value generator 2, and is stored in register 33 (see the line corresponding to the number of gradation levels, "4", in FIG. 3). As a result, comparators 10a, 10b, and 10c in dither processor 1 are enabled by the multi-gradation level information.

Information DGI indicating the differential values (+9 and +19) set by data input section 5 is output to threshold value generator 2. With this operation, the differential value "0" is stored in register 31a in FIG. 12; the differential value "+9", in register 31b; and the differential value "19", in register 31c.

Basic dither information BDI set by data input section 5 is stored in basic dither information memory 3 by dither information reader/writer 4. For example, "198" is stored at address 0; "28", at address 1; "113", at address 2; "170", at address 3; "0", at address 4; "85", at address 5; "227", at address 6; "57", at address 7; and "142", at address 8. In addition, the line No. "3" is set in line No. set register 51 in address generator 4a, and the file No. "3" is set in file No. set register 54 in accordance with dither size information DSI set by data input section 5.

With this operation, address generator 4a repeatedly outputs addresses 0, 1, and 2 in accordance with line sync signal LS of the first line; repeatedly outputs addresses 3, 4, and 5 in accordance with line sync signal LS of the second line; and repeatedly outputs addresses 6, 7, and 8 in accordance with line sync signal LS of the third line. Subsequently, the same addresses as those described above are generated every time the scanning line of the scanner is switched.

With this operation, for the first line, "198" at address 0, "28" at address 1, and "113" at address 2 are repeatedly output, as dither threshold values serving as basic dither information BDI, from basic dither information memory 3. For the second line, "170" at address 3, "0" at address 4, and "85" at address 5 are repeatedly output as dither threshold values serving as basic dither information BDI. For the third line, "227" at address 6, "57" at address 7, and "142" at address 8 are repeatedly output as dither threshold values serving as basic dither information BDI. Subsequently, similar threshold values are output every time the scanning line of the scanner is switched.

When input image data of the first pixel of the first line of an image is supplied from the scanner, address data D44 of address 0 and read control signal D42 are output from address generator 4a to basic dither information memory 3. As a result, "198" at address 0 in basic dither information memory 3 is read out, as basic dither information BDI, and output to adders 32a to 32o in threshold value generator 2. In this case, the differential value "0" is stored in register 31a; the differential value "+9", in register 31b; and the differential value "+19", in register 31c. For this reason, basic dither information BDI from basic dither information memory 3 is output, as dither threshold value Th1, from adder 32a, without any modification; the value "207" obtained by adding "+9" to basic dither information BDI is output, as dither threshold value Th2, from adder 32b; and the value "217" obtained by adding "+19" to basic dither information BDI is output, as dither threshold value Th3, from adder 32c (see FIG. 11). Dither threshold values Th1, Th2, and Th3 from adders 32a, 32b, and 32c are respectively supplied to comparators 10a, 10b, and 10c.

The input image data of the first pixel of the first line, supplied from the scanner, is compared with the dither threshold values "198", "207", and "217" by comparators 10a, 10b, and 10c, respectively. As a result, 2-bit output image data OMD corresponding to the comparison results from comparators 10a, 10b, and 10c are output from output lines 11a and 11b of output encoder 11 to a printer as an output device.

When the input image data of the second pixel of the first line of the image is supplied from the scanner, address data D44 of address 1 and read control signal D42 are output from address generator 4a to basic dither information memory 3. As a result, "28" at address 0 in basic dither information memory 3 is read out, as basic dither information BDI, and output to adders 32a to 32o in threshold value generator 2. In this case, the differential value "0" is stored in register 31a; the differential value "+9", in register 31b; and the differential value "+19", in register 31c. For this reason, basic dither information BDI from basic dither information memory 3 is output, as dither threshold value Th1, from adder 32a, without any modification; the value "37" obtained by adding "+9" to basic dither information BDI is output, as dither threshold value Th2, from adder 32b; and the value "47" obtained by adding "+19" to basic dither information BDI is output, as dither threshold value Th3, from adder 32c (cf. FIG. 11). Dither threshold values Th1, Th2, and Th3 from adders 32a, 32b, and 32c are respectively supplied to comparators 10a, 10b, and 10c.

The input image data of the second pixel of the first line, supplied from the scanner, is compared with the dither threshold values "28", "37", and "47" by comparators 10a, 10b, and 10c, respectively. As a result, 2-bit output image data OMD corresponding to the comparison results from comparators 10a, 10b, and 10c are output from output lines 11a and 11b of output encoder 11 to the printer as the output device.

The input image data of the third pixel of the first line, supplied from the scanner, is processed in the same manner as described above. The result data is compared with the dither threshold values "113", "122", and "132", and the comparison results are output.

Subsequently, three sets of the dither threshold values "198, 207, 217", "28, 37, 47", and "113, 122, 132" corresponding to the dither threshold values "198, 28, 113" from basic dither information memory 3 described above are sequentially and repeatedly used with respect to the first line of the image supplied from the scanner (cf. FIG. 11).

Three sets of the dither threshold values "170, 179, 189", "0, 9, 19", and "85, 94, 104" corresponding to the dither threshold values "170, 0, 85" from basic dither information memory 3 are sequentially and repeatedly used with respect to the second line. Three sets of the dither threshold values "227, 236, 246", "57, 66, 76", and "142, 151, 161" corresponding to the dither threshold values "227, 57, 142" from basic dither information memory 3 are sequentially and repeatedly used with respect to the third line (cf. FIG. 11).

Subsequently, every time the scanning line of the scanner is switched, dither threshold values (FIG. 11) switched for each line are used.

Figure 14:
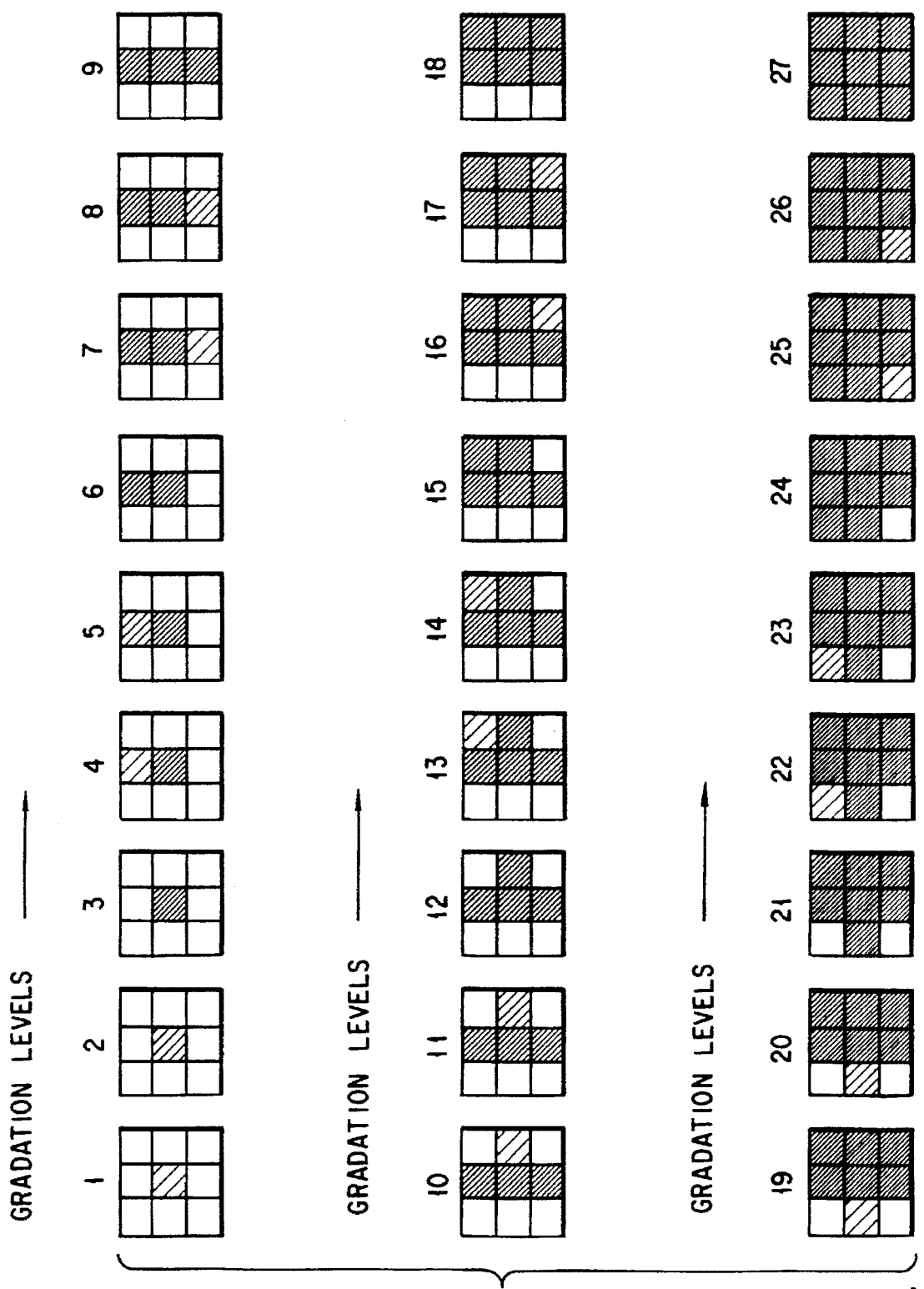
FIG. 14 shows print results obtained when multi-gradation level (four levels) processing is performed by using the dither matrices shown in FIG. 11.

Note that FIG. 14 shows gradation levels printed by using the above-mentioned dither threshold values.

Figure 16:
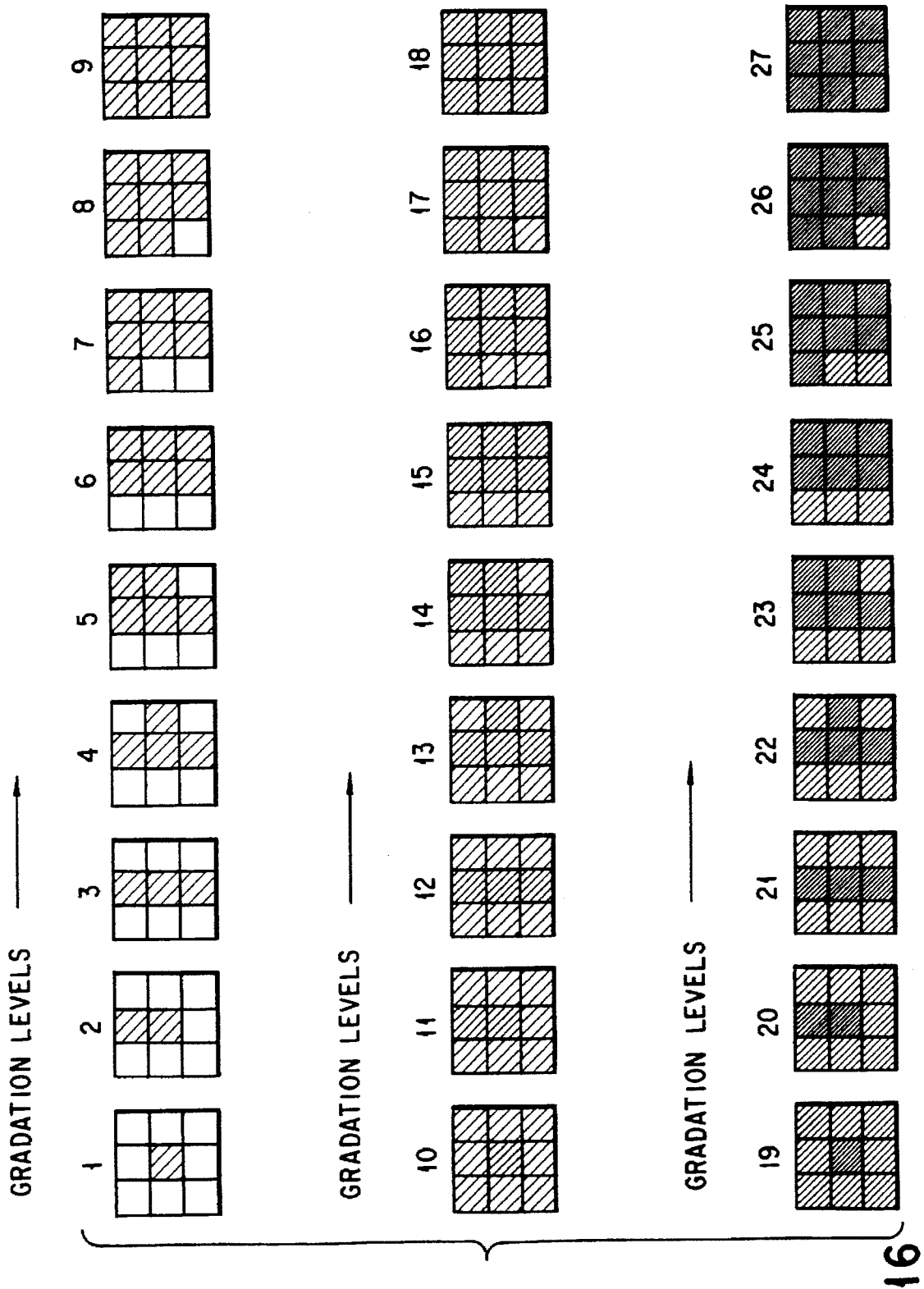
FIG. 16 show print results obtained when multi-gradation level (four levels) processing is performed by using the dither matrices in FIG. 15.

As another embodiment, other dither values may be used. For example, the dither threshold values shown on the left side of FIG. 15 are used for a basic matrix (plane P1), and the differential values between planes P1 and P2, and between planes P1 and P3 are respectively set to be "+85" and "+170". As a result, the dither threshold values shown in the center of FIG. 15 are obtained as dither threshold values for plane P2, and the dither threshold values shown on the right side of FIG. 15 are obtained as dither threshold values for plane P3. FIG. 16 shows gradation levels printed by using the above-mentioned dither threshold values.

Another method of obtaining derived matrices is available. As shown in FIGS. 17A to 17C, threshold values are randomly arranged at corresponding positions among planes P1 to P3. Basic dither information BDI is stored in basic dither information memory 3 in units of 4-bit data, as shown in FIG. 18. Threshold values can be generated by the arrangement shown in FIG. 19 using the stored information. In this case, the ratio of nth threshold value Th(n) to (n+1)th threshold value Th(n+1) is set to be constant with respect to n. Ratio data D61 is stored in coefficient value register 61 in advance, and the minimum threshold values of plane P1 to P3 are respectively stored in differential value registers 62a to 62c in advance.

Figure 19:
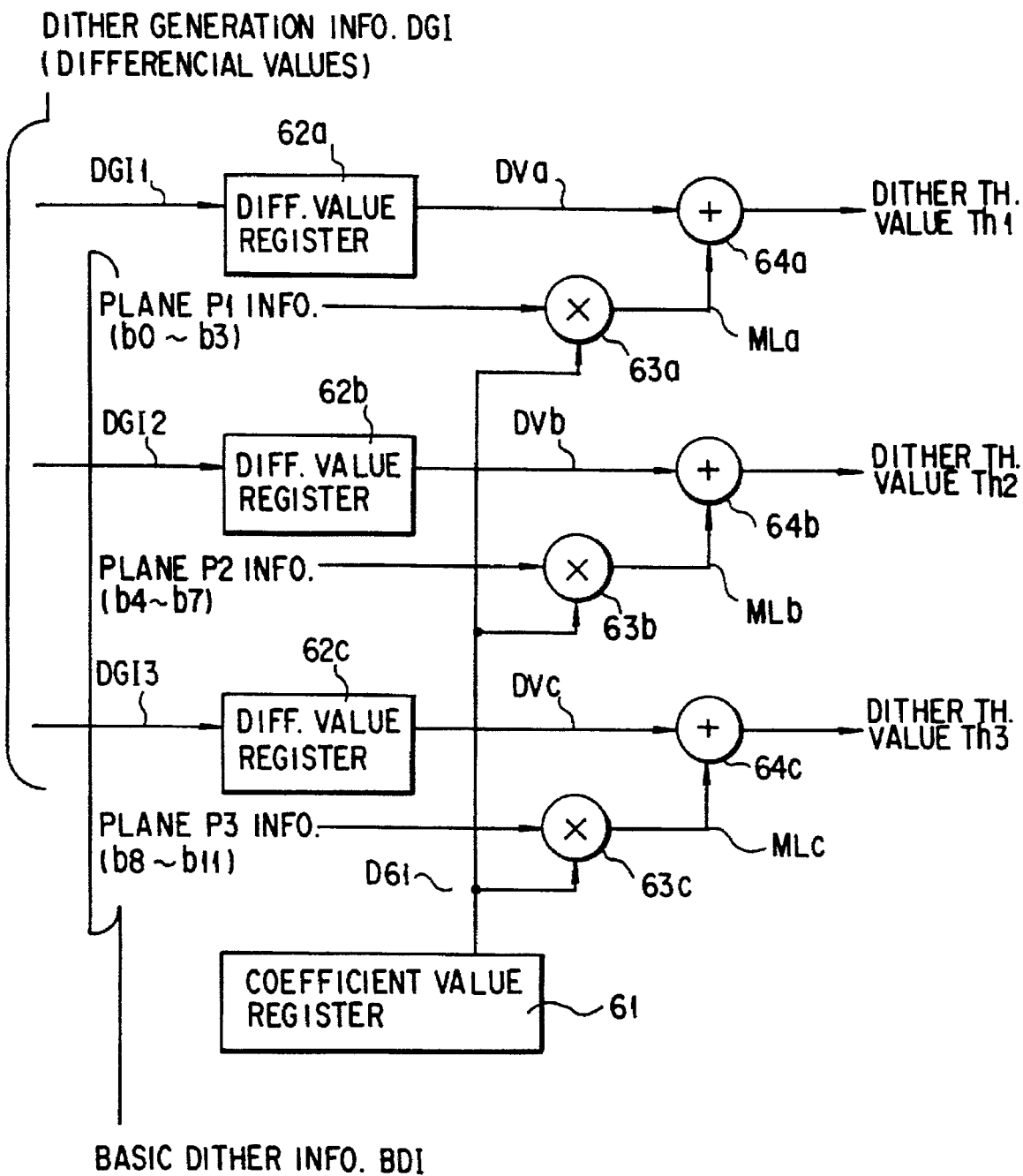
FIG. 19 is a block diagram showing another example of threshold value generator 2 in FIG. 1.

For example, the differences between the threshold values are stored in coefficient value register 61. In addition, the minimum threshold value (DGI1) of plane P1 is stored in differential value register 62a; the minimum threshold value (DGI2) of plane P2 is stored in differential value register 62b; and the minimum threshold value (DGI3) of plane P3 is stored in differential value register 62c. Furthermore, as shown in FIGS. 17A to 17C, information obtained by assigning numbers ("0" to "8") to the respective threshold values of planes P1 to P3 is stored, as basic dither information BDI, in basic dither information memory 3 in advance. As shown in FIG. 19, pieces of divided information (b0 to b3), (b4 to b7), and (b8 to b11) of basic dither information BDI are multiplied by the contents of coefficient value register 61 through multipliers 63a to 63c. Contents DVa to DVc of differential value registers 62a to 62c are added to multiplication results MLa to MLc by adders 64a to 64c, thereby generating threshold values Th1 to Th3.

Figure 20A:
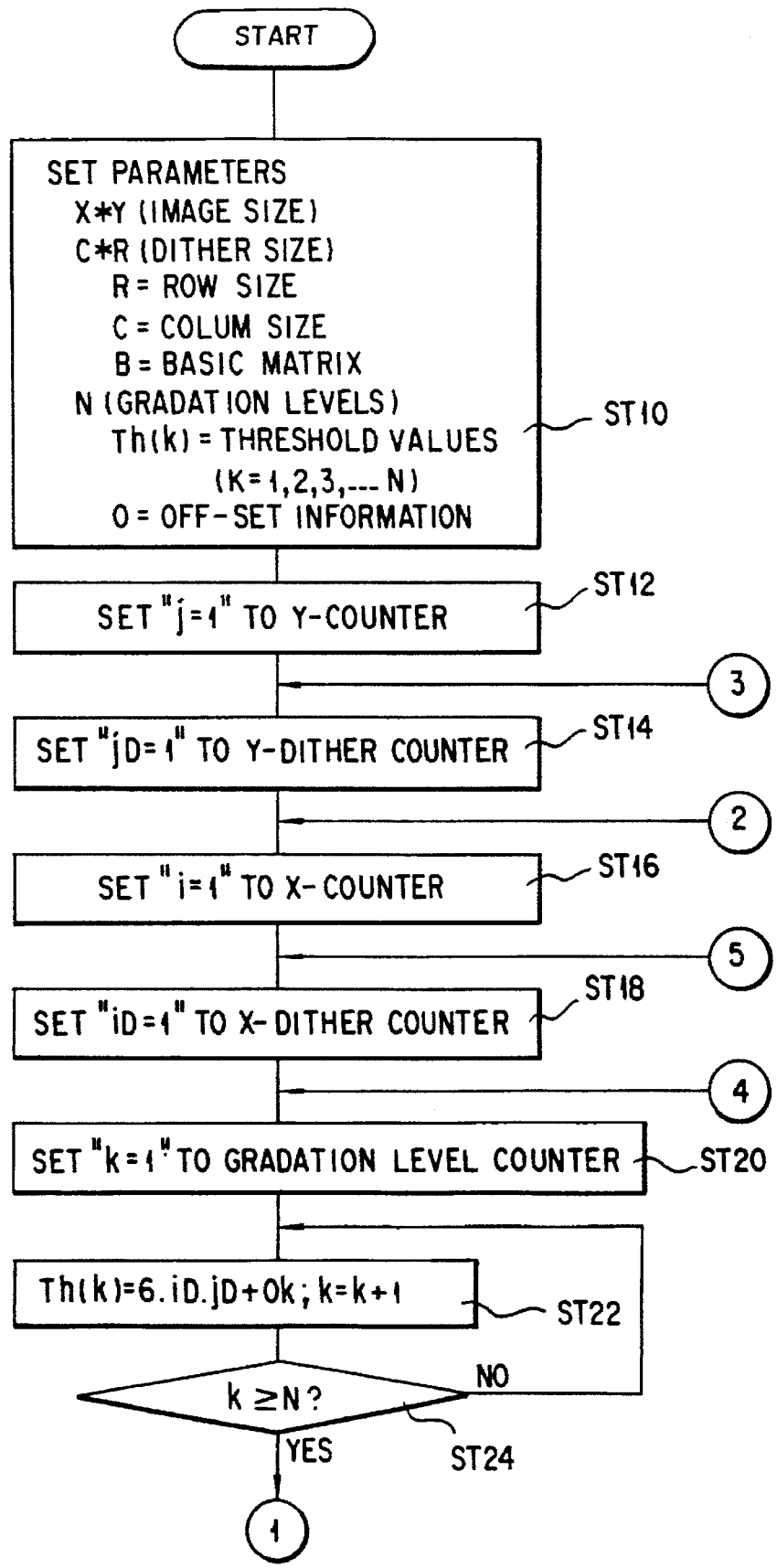

FIGS. 20A and 20B are flow charts for explaining a case wherein gradation processing which uses derived dither matrices is performed by means of software. This procedure can be applied to a case wherein the function of threshold value generator 2 in FIG. 1 is realized by an apparatus constituted by conventional units such as a microcomputer (CPU), a memory, and a counter (see FIG. 22).

First, the image size (horizontal length X and vertical length Y) of input image data IMD to be subjected to gradation processing, the size (line No. row/line R and file No. column/file C) of a dither matrix, and the number N of gradation levels (one of "2" to "16" if the maximum number of gradation levels is "16") are input through a keyboard (or by menu selection using a mouse) of data input section 5 in FIG. 1 (step ST10).

Assume that in the arrangement shown in FIG. 22, dither generation information DGI supplied to CPU 200 via I/O 201 includes image size information (X*Y), dither size information DSI includes dither matrix information (C*R), and dither threshold information DTI includes gradation level number information (N).

CPU 200 then generates necessary gradation processing data from dither generation information DGI input in this manner.

If, for example, A4 size (210 mm×297 mm) is selected as the image size of image data to be subjected to gradation processing, corresponding pixel counts (e.g., X=2100 and Y=2970) as the values of horizontal and vertical lengths X and Y are read out from 202. In this case, if the number of gradation levels is set to be "4", the number k of threshold values required for gradation processing is set to be "3", and data of k=3 is stored at a predetermined address in RAM 203.

When "3×3" is designated as a dither matrix size, "3" is set as file No. data C, and "3" is set as line No. data R. These data (dither matrix size C*R=3×3) are stored at predetermined addresses in RAM 203.

If, for example, gradation processing of patterns like those shown in FIG. 14 is to be performed, "0", "+9", and "+19" are set as offset information Ok (k=1, 2, 3) (see FIG. 11). These data (O[k=1]=0, O[k=2]=+9, and O[k=3]=+19) are also stored at predetermined addresses in RAM 203.

CPU 200 reads out basic dither matrix B constituted by numerical values like those shown in FIG. 2 from ROM 202 on the basis of the set data (X*Y; C*R; N; Ok), and temporarily holds the data at predetermined addresses in RAM 203.

Initial value j=1 in the vertical direction of the image represented by input image data IMD is set in Y-counter 204 (step ST12). Initial value jD=1 in the vertical direction of the dither matrix is set in Y-dither counter 205 (step ST14).

Subsequently, initial value i=1 in the horizontal direction of the image represented by input image data IMD is set in X-counter 206 (step ST16). Initial value iD=1 in the horizontal direction of the dither matrix is set in X-dither counter 207 (step ST18). Initial value k=1 of the number of gradation levels is set in gradation level counter 208 (step ST20).

Offset value Ok ("0" in this case) of number of gradation levels k=1 is added to the basic dither matrix value ("198" in FIG. 11) located on the iDth row/jDth column (first row/first column) of the dither matrix. As a result, the numerical value "198" is determined as threshold value Th1 on the first row/first column of matrix plane P1. At the same time, gradation level parameter k is incremented by one (step ST22).

The number N of gradation levels set in this case is "4", and gradation level parameter k set after it is incremented is "2" (NO in step ST24).

In this case, offset value Ok ("+9" in this case) of number of gradation levels k=2 is added to the base matrix value ("198" in FIG. 11) located on the first row/first column of the dither matrix. With this operation, the numerical value "207" is determined as threshold value Th3 on the first row/first column of matrix plane 2. At the same time, gradation level parameter k is incremented by one (step ST22).

Since k=3 is still lower than set number of gradation levels N=4 (NO in step ST24), the processing in step ST22 is repeated. That is, the numerical value "217" is determined as threshold value Th3 on the first row/first column of matrix plane P3. At the same time, gradation level parameter k is incremented by one (step ST22).

When k=4 is set in this manner (YES in step ST24), threshold values Th1 to Th3 ("198", "207", and "217") on the first rows/first columns of the dither matrices are obtained.

Dither processor 1 in FIG. 1 performs four-gradation level processing with respect to pixels (located at positions i=1, iD=1, and JD=1) on the first rows/first columns of the dither matrices by using threshold values Th1 to Th3 obtained in this manner. After this gradation processing, parameter i of a gradation processing target area is incremented by one. At the same time, dither matrix initial value iD=1 is incremented by one (step ST26).

Set value X is "2100", and set value C is "3". In this case, parameter i is still "2" (NO in step ST28), and parameter iD is also "2" (NO in step ST30). As a result, the gradation processing in steps ST20 to ST26 is performed with respect to the pixel at position i=2, iD=2, and jD=1.

The gradation processing in steps ST20 to ST26 is repeated until iD>C (=3) is satisfied (YES in step ST30).

If parameter iD is incremented in step ST26, and iD>C (=3) is satisfied (YES in step ST30), X-dither counter 207 is reset to "1" (step ST18), and the processing in steps ST20 to ST26 is repeated until iD>C (=3) is satisfied. This repetitive processing is repeated until incremented parameter i exceeds "2100" in step ST26.

If image position parameter i exceeds "2100" (YES in step ST28), dither matrix position parameter jD is incremented by one (step ST32).

Set value R is "3". In this case, parameter JD is still "2" (NO in step ST34). Parameter i is then reset to "1" (step ST16), and parameter iD is reset to "1" (step ST18). As a result, the gradation processing in steps ST20 to ST26 is performed with respect to the pixel at position i=1, iD=1, and JD=2.

The processing in steps ST16 to ST32 is repeated until JD>R (=3) is satisfied (YES in step ST34).

When parameter JD is incremented in step ST32, and jD>R (=3) is satisfied (YES in step ST34), pixel position j is compared with set value Y=2970. Pixel position parameter j set in step ST12 is still "1" (NO in step ST36). Parameter j is then incremented by one (step ST38), and the processing in steps ST14 to ST34 is repeated. This repetitive processing is repeated until parameter j incremented in step ST38 exceeds "2970". If parameter j exceeds Y=2970 (YES in step ST36), the gradation processing based on the parameters set in step ST10 is completed.

FIG. 21A shows a basic dither matrix for eight-gradation level processing. In this case, a set of dither threshold values in the form of a rhombus is set in an 8×8 dither matrix. For eight-gradation level processing, six other dither matrix data are required. These data can be derived (calculated) by offsetting the basic dither matrix in FIG. 21A by (20)hex. FIGS. 21B to 21G show six dither matrices derived in this manner. If ordered dither processing is performed by using the dither matrices shown in FIGS. 21A to 21G, output image data OMD having very smooth gradation can be obtained.

Although various arrangements other than that described above may be considered, the dither generation method shown in FIGS. 17A to 19 becomes complicated as the dither matrix size (R rows/C columns) or the number of gradation levels (corresponding to "k+1" of Th(k)) of the output device increases. However, this method can be effectively applied to a case wherein the number of gradation levels of the output device is small or the dither matrix size is small. In addition, the dither generation method shown in FIGS. 11 and 12 can be effectively applied to a case wherein the matrix size is large or the number of gradation levels of the output device is large.

Furthermore, if an error buffer (not shown) used for a multi-gradation level error diffusion processing method as a feedback type gradation processing method is used in place of basic dither information memory 3, a plurality of types of multi-gradation level processing such as the above-described multi-gradation level dither processing and error diffusion processing can be executed by the same circuit arrangement.

As described above, in the multi-gradation level processing performed by using the ordered dither scheme, offset information between one basic dither matrix value and dither matrices is stored, and all multi-gradation level threshold values are calculated from the basic dither matrix values and the offset information. An input image is then compared with the calculated threshold values to perform multi-gradation level processing.

With this operation, in multi-gradation level processing performed by using the ordered dither scheme, all the dither threshold values required for the multi-gradation level processing can be generated from the basic dither matrix information and the offset information, thus allowing simplification and an increase in processing speed of the threshold value generation method. In addition, basic dither matrix information and offset information can be arbitrarily set to change the size, shape, and the like of a dither matrix. This allows multi-gradation level processing by means of a flexible ordered dither scheme.

As has been described in detail above, there is provided an image processing apparatus used for multi-gradation level processing performed by the ordered dither scheme, in which all the dither threshold values required for the multi-gradation level processing are generated from basic dither matrix information so that an increase in speed of multi-gradation level processing, and simplification of the structure can be realized.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An image processing apparatus for processing image data comprising:

means for storing a basic dither matrix having a plurality of threshold values for digitizing the image data;

means for generating a plurality of derived dither matrices, each of the dither matrices having threshold values obtained by off-setting a predetermined value against the respective threshold values of the basic dither matrix stored in said storing means;

a plurality of comparators respectively for receiving values of the derived dither matrices generated by said generating means, where each of said comparators compares the image data with the received value of the derived dither matrix to provide one of the digitized data;

means for receiving the image data;

means for digitizing the image data received by said receiving means using at least one of the basic dither matrices stored in said storing means and the derived dither matrices generated by said generating means so as to provide a plurality of digitized data; and means for producing output image data having multigradation levels in accordance with the plurality of digitized data provided by said digitizing means.

2. An apparatus according to claim 1, further comprising:

means for providing gradation processing information which defines a manner of generating the derived dither matrix from the basic dither matrix stored in said storing means wherein the gradation processing information provided by said providing means includes predetermined offset information, and said generation means includes means for outputting the derived dither matrices by combining the offset information with the basic dither matrix stored in said storing means.

3. An apparatus according to claim 1, wherein said generation means includes offset information generation means for generating predetermined offset information by modifying information of the basic dither matrices generated by said generating means with predetermined coefficient information, and means for outputting the values of the derived dither matrices by combining the offset information generated by said offset information generation means with the gradation processing information provided by said providing means.

4. An apparatus according to claim 2, wherein said providing means includes means for designating a size of the input image data, which is to be subjected to an ordered dither processing, as part of the gradation processing information.

5. An apparatus according to claim 2, wherein said providing means includes means for designating a size of the derived dither matrices, used for an ordered dither processing, as part of the gradation processing information.

6. An apparatus according to claim 2, wherein said providing means includes means for designating a shape of the derived dither matrices, used for an ordered dither processing, as part of the gradation information.

7. An apparatus according to claim 2, wherein said providing means includes means for designating a number of gradation levels in an ordered dither processing as part of the gradation processing information.

8. An image processing method for processing image data comprising computer-implemented steps of:

presetting parameters for designating an image size of the image data to be gradation-processed, an ordered dither size, and a desired number of gradation levels;

setting the parameters of the image size, the ordered dither size, and the number of gradation levels to initial values;

performing gradation processing based on an ordered dither method with respect to each pixel of the image data while changing the respective parameters set to the initial values; and repeatedly executing a predetermined number of times the gradation processing based on the ordered dither processing.

9. An image processing system for processing image data comprising:

means for presetting parameters for designating an image size of the image data to be gradation-processed, an ordered dither size, a desired number of gradation levels;

means for setting the parameters of the image size, the ordered dither size, and the number of gradation levels to initial values;

means for performing gradation processing based on an ordered dither method with respect to each pixel of the image data while changing the respective parameters set to the initial values; and means for repeatedly executing a predetermined number of times the gradation processing based on the ordered dither processing.

10. An image processing apparatus for multi-gradation-level processing an input image by ordered dither processing, comprising:

means for setting offset information between one basic dither matrix and a dither matrix;

means for storing the offset information between the one basic dither matrix and the dither matrix set by said setting means;

means for calculating all multi-gradation threshold values from the basic dither matrix and the offset information; and means for performing multi-gradation level processing by comparing the input image with the multi-gradation threshold values calculated by said calculating means.

* * * * *